(12) United States Patent
Hobbs et al.

(10) Patent No.: US 7,197,207 B2
(45) Date of Patent: Mar. 27, 2007

(54) APPARATUS AND METHOD FOR OPTICAL INTERCONNECTION

(75) Inventors: Philip Charles Danby Hobbs, Briarcliff Manor, NY (US); Maurice McGlashan-Powell, Mt. Vernon, NY (US)

(73) Assignee: International Business Machines Corporation, Armonk, NY (US)

( * ) Notice: Subject to any disclaimer, the term of this patent is extended or adjusted under 35 U.S.C. 154(b) by 863 days.

(21) Appl. No.: 10/091,515

(22) Filed: Mar. 7, 2002

(65) Prior Publication Data

US 2004/0208589 A1    Oct. 21, 2004

(51) Int. Cl.
*G02B 6/26* (2006.01)
(52) U.S. Cl. .................................... 385/31
(58) Field of Classification Search ........... 385/1–3
See application file for complete search history.

(56) References Cited

U.S. PATENT DOCUMENTS 6,563,185 B2 *   5/2003   Moddel et al. ............. 257/425

6,917,727 B2 *   7/2005   Gunn et al. .................. 385/14

OTHER PUBLICATIONS

Wilke et al., "Nanometer Thin-Film Ni—NiO—Ni Diodes for 30 THz Radiation", pp. 329-341 *Applied Physics A 58* (1994).
Fumeaux et al., Mixing of 30 THz laser radiation with nanometer thin-film Ni—NiO—Ni diodes and integrated bow-tie antennas, pp. 135-140 *Applied Physics B 63* (1996).
"Ac electron tunneling at infrared frequencies: Thin-film M-O-M diode structure with broad-band characteristics"; Applied Physics Letter, vol. 24, No. 6, Mar. 15, 1974, Small et al., pp. 275-279.

* cited by examiner

*Primary Examiner*—Sarah Song
(74) *Attorney, Agent, or Firm*—Stephen C. Kaufman, Esq.; McGinn IP Law Group, PLLC

(57) ABSTRACT

An apparatus (and method) for launching a modulated optical signal, includes a waveguide, an antenna structure for communicating with the waveguide and with an externally-applied optical field and having an output port, and an electrically-variable-impedance device connected at the antenna's output port, capable of responding at a frequency of an externally-applied optical field and having its impedance at the optical frequency changed by an applied electrical signal.

48 Claims, 9 Drawing Sheets

APPARATUS AND METHOD FOR OPTICAL INTERCONNECTION

BACKGROUND OF THE INVENTION

1. Field of the Invention

The present invention generally relates to a method and apparatus for optical interconnection and more particularly to a method and apparatus for optical interconnection in which an antenna is provided in a waveguide structure such that space and power are saved.

2. Description of the Related Art

Long-haul, high speed data communications are currently handled almost exclusively by fiber optic transmission systems. These systems operate at wavelengths of about 1.3 microns to about 1.56 microns, where silica waveguides are highly transparent, because minimizing the optical loss is a key engineering requirement in such systems.

Lasers and photodiodes at those wavelengths must be made of compound semiconductors such as indium-gallium arsenide (InGaAs) or the like. The expense and difficulty of using these materials is more than repaid by the huge bandwidths and inter-repeater distances they allow. Latencies in these networks are tens of milliseconds at least.

Shorter-range optical interconnection systems such as optical LANs and Fiber Channel disk array connections usually use 850 nm light, because at that wavelength ordinary gallium-aluminum arsenide lasers and silicon photodiodes are available at low cost, and fiber attenuation is not a major concern. Latencies here should be a few milliseconds at the most.

The shortest-range interconnections (e.g., on-chip and between-chip communications inside routers, computers, and other data-handling devices) are currently performed with metal wires in dielectric surroundings, which is cheap, highly dense, and well-proven.

However, as data rates increase, wiring will increasingly suffer loss, crosstalk, and drive power disadvantages. Thus, there is a general move underway to bringing optical interconnections to these small-scale applications, where their low loss, extreme bandwidth, potentially low power, and crosstalk-free operation will be of great value. However, the application is difficult for the optics since it requires high density, low cost, and extremely low latency (e.g., 100 picoseconds to a few nanoseconds).

The primary limiting factors on these short-range optical interconnections have been their high cost, large size, long latencies, and the drive power requirements of the current technologies. The root of these problems is that there have been no monolithically integrated optical interconnection technologies. That is, each one has required hybrid construction, to route the electrical logic signals through a laser driver, laser, waveguide, photodiode, and transimpedance amplifier chain. The optoelectronic components (e.g., vertical-cavity surface emitting lasers (VCSELs), InGaAs photodiodes, etc.) cannot be made in silicon, and the laser driver chip must provide a 2-V output swing, which a processor working from a single 1-V supply cannot do without ancillary circuitry such as a charge pump.

Further, as noted above, currently there is a separate laser or a separate modulator provided for each fiber or waveguide. Thus, for every single line, at least one component must be provided therefor on the board. Each of these components must be soldered or bonded on the board since lasers cannot be made of silicon. This is problematic due to space, cost, and yield detraction.

A further problem of hybrid construction is that the logic signal must be transmitted electrically between the logic output and the laser or modulator. If the laser or modulator is a separate chip, then this configuration requires the signal to be sent across an electrical transmission line on the module or circuit board, whose bandwidth and drive power requirements limit the benefit to be gained from the optical interconnection.

Hence, before the present invention, these disadvantages have prevented such optical technology from being applied to on-chip and between-chip interconnections.

SUMMARY OF THE INVENTION

In view of the foregoing and other problems, drawbacks, and disadvantages of the conventional methods and structures, an object of the present invention is to provide a method and structure in which optical technology can be applied to on-chip and between-chip interconnections.

Another object is to permit a laser to function as an optical power supply whose output is externally generated and can be externally applied to one or more structures, via a waveguide or via free propagation (or both), rather than a separate laser being used for each connection.

In a first aspect of the present invention, an apparatus (and method) for launching a modulated optical signal into a waveguide, includes a waveguide, an antenna structure for communicating with the waveguide and with an externally-applied optical field and having an output port, and an electrically-variable-impedance device connected at the antenna's output port, capable of responding at a frequency of an externally-applied optical field and having its impedance at the optical frequency changed by an applied electrical signal.

In a second aspect, an apparatus (and method) for detecting an optical signal in a waveguide, includes an antenna structure for communicating with the waveguide and having an electrical output port, and an electrically-connected detector connected at the antenna's output port, capable of responding at a frequency of the optical signal in the waveguide and for producing a detected electrical signal at baseband.

In a third aspect, an apparatus (and method) for optical information transmission, includes a waveguide, a modulating antenna structure for communicating with the waveguide and having an output port, a receiving antenna structure for communicating with the waveguide and having an output port, an electrically-variable-impedance device connected at the antenna's output port, capable of responding at a frequency of an externally-applied optical field and having its impedance at an optical frequency changed by an applied electrical signal, and an electrically-connected detector connected at the receiving antenna's output port, capable of responding at the frequency of an optical signal in the waveguide and producing a detected electrical signal at baseband.

In a fourth aspect, an apparatus (and method) for launching optical information in a waveguide, includes a waveguide, an antenna structure for communicating with the waveguide and having an output port, an electrically-variable-impedance device connected at the antenna's output port, capable of responding at more than one frequency of an externally-applied optical field and causing the antenna to radiate a mixing product between the optical frequencies (i.e., a signal at a frequency corresponding to sums or differences of integer multiples of the optical frequencies).

In a fifth aspect, an apparatus (and method) for detecting optical information in a waveguide, includes a waveguide, an antenna structure for communicating with the waveguide and having an output port, a detector connected at the antenna's output port, capable of responding at more than one frequency of an optical field in the waveguide and producing a detected electrical signal at a frequency corresponding to a mixing product of the optical frequencies. This relies on the inherent nonlinearity of the detector.

With the unique and unobvious aspects of the invention, the present invention allows the electrical-optical-electrical transduction to be simplified enormously and provides high density (compared with other optical interconnects). Optical interconnects are normally less dense than conventional wires since bulky hybrid construction and elaborate laser driver and receiver circuitry is eliminated. Further, one laser source can be used commonly for illumination for a plurality of interconnects. Conventionally, a dedicated laser (and dedicated driver chip and dedicated photoreceiver at the other end) has been used for each line.

With the invention, such a dedicated laser, dedicated driver chip, and dedicated photoreceiver are unnecessary. Instead, as mentioned above, one common laser and driver circuit can be used, its output being routed to each modulator by waveguides or free-space propagation, so that it can be used for a plurality of interconnects. The structure of the invention serves as the receiver and as the modulator. Thus, valuable chip "real estate", bonding pads, bonding wires, etc. are saved with the inventive use of a common laser source. Further, the invention uses an antenna as a waveguide receiver which is novel over the conventional structures.

Another advantage of the invention is the extreme bandwidths (e.g., data has shown that the limit is higher than about 200 GHz) which are made possible, and near-zero latency. Such near-zero latency is provided since the signal need not go off the chip through a series of slow components (e.g. demultiplexers, long wires, etc.).

Further, the inventive structure can be manufactured entirely in monolithic silicon circuitry. Additionally, a great deal of power is saved over the conventional structures.

In its simplest form, the invention operates by putting an antenna structure with a tunnel junction at each end of a dielectric waveguide, illuminating at least one of the antennas with a laser beam coming up through the silicon substrate, modulating the wave scattered down the guide by changing the tunnel junction bias with a logic signal, and detecting the resulting modulated scattered light with the other antenna.

It is noted that more elaborate antenna structures than a "bowtie" dipole can find great benefit with the invention and thus are also contemplated, either a multi-resonator approach such as a Yagi-style antenna, a grating structure which can be turned on and off in various ways, or a phased array such as a collinear antenna.

Because ordinary antennas must couple into free-space waves, such antennas are normally bilaterally symmetric, but as in the coaxial cable-to-metal-waveguide transition, an asymmetric structure may provide improved coupling into the lowest-order waveguide mode, especially since integrating metal elements into the core of the waveguide is difficult, and the coupling so achieved may be too strong, so that it is better to put the metal elements in the cladding region.

Some key differentiators between the present invention and the conventional arrangements include modulating the coupling between an incident freely-propagating wave and a waveguide mode by changing the impedance of a tunnel junction formed as part of the coupler structure, and modulating a signal in a waveguide by changing the absorption and scattering of the antenna in the same manner.

Further, the invention uses an antenna/tunnel junction combination as a waveguide detector. Additionally, the invention combines the antenna/tunnel junction combination as a waveguide detector into an optical interconnection system of extreme bandwidth, low power, high density, near-zero latency, and totally monolithic construction.

BRIEF DESCRIPTION OF THE DRAWINGS

The foregoing and other purposes, aspects and advantages will be better understood from the following detailed description of a preferred embodiment of the invention with reference to the drawings, in which.

DETAILED DESCRIPTION OF PREFERRED EMBODIMENTS OF THE INVENTION

Figure 1:
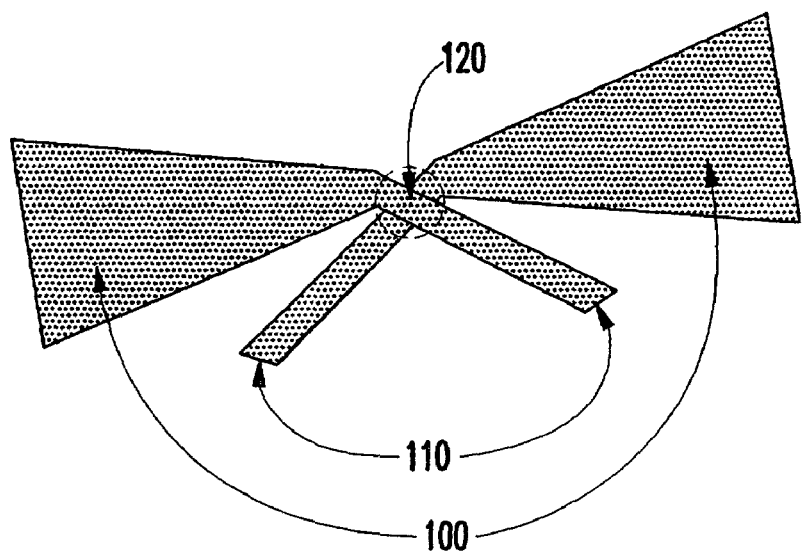
FIG. 1 illustrates an exemplary dipole antenna which can be used with the present invention.

Referring now to the drawings, and more particularly to FIGS. 1–10, there are shown preferred embodiments of the method and structures according to the present invention.

Preferred Embodiment

Turning now to FIG. 1, generally a dipole antenna 100 is shown including structures 110 for input/output of baseband signals and a tunnel junction 120 (e.g., formed of Ni—NiO—Ni, etc.).

The antenna 100 terminated in its characteristic impedance functions as an absorber with an effective cross-section much larger than its geometrical cross-sectional area. This allows the antenna 100 to be an efficient transducer of an incoming wave to an electrical signal at the antenna terminals.

In addition to the absorption, an antenna also scatters the incoming wave into other plane wave components. Such a small scatterer produces essentially a pure dipole pattern in the far field.

The optical theorem (also known as the "extinction sum rule") provides that the integral of the interference term between the light scattered by the dipole and the incident beam equals the total absorption plus the total scatter. This allows an estimate of the field scattered from these antenna structures from the extinction of the incident beam.

If the antenna is lossless, then the phase of the scattered field can be varied from 0 to π by changing the terminating impedance at the antenna terminals. An open-circuited antenna produces little or no scattered field, while a short-circuited antenna produces four times the scatter of a matched antenna.

Since changing the terminating impedance of an antenna 100 changes its scattered field, the scattered field can be modulated by changing the terminating impedance.

Figure 2:
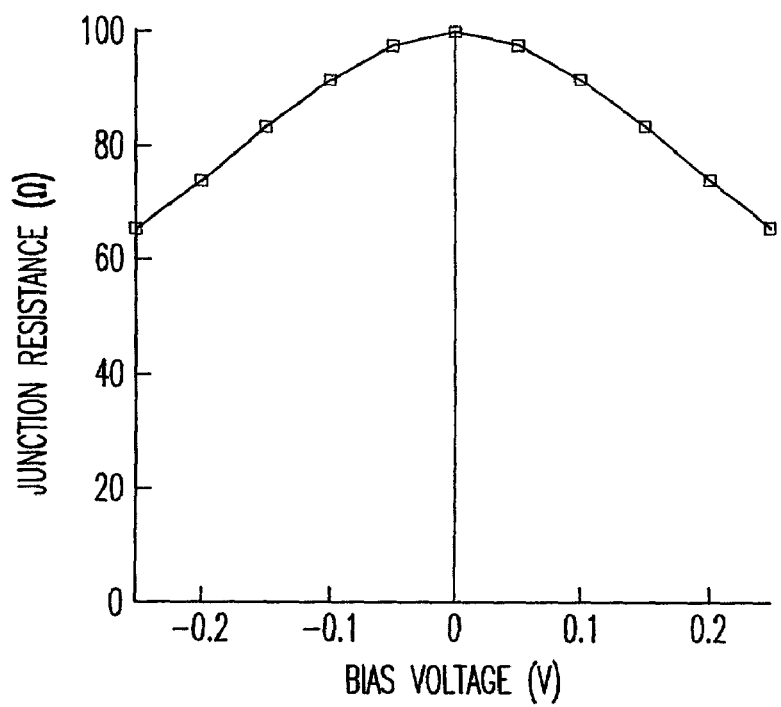
FIG. 2 is a graph illustrating a junction resistance as a function of bias voltage.

FIG. 2 illustrates the tunnel junction (120) resistance as a function of bias voltage, and shows the operating principle for actually performing the modulation which the invention desires.

With the antenna 100 and tunnel junction 120 having the characteristics shown in FIG. 2, the impedance can be changed from the matched condition (with a voltage stand-wave ratio (VSWR) of 1.0) to a mild mismatch with VSWR=1.5 by changing the bias on the tunnel junction 120 from 0V to 250 mV (I=3 mA), or from a small mismatch of approximately, 1.4 VSWR to a larger one of 2.2.

Moving away from the matched condition slightly will increase the strength of the modulation while decreasing its contrast. Advances in tunnel junction design and improvements in antenna design can be expected to increase the contrast between these two states.

Because the required voltage swing is small, well within the capability of ordinary logic gates in processor ICs, the tunnel junction 120 can be driven from the output of a logic gate, so that the scattering cross section of the antenna 100 can be modulated, as well as the phase of the scattered field, in accordance with the logic signal.

Either or both of these properties can be used to impress a modulation on an incident field, and either one can be used to perform either amplitude or phase modulation, since it is easy to provide other scatterers producing their own scattered fields with appropriately chosen amplitude and phase relationships to the controlled antenna or antennas. The reflector and director elements of a Yagi antenna are examples of such auxiliary structures. The interference of the several fields can be used to modulate the total scattered field in a given direction in almost any desired manner.

If the antenna 100/tunnel junction 120 combinations are coupled to a dielectric waveguide and illuminated by an external pump laser, via either free propagation or the waveguide, an altogether new capability is produced. There, the invention modulates the laser light in accordance with a signal input to an antenna.

It is noted that there has been demonstrated mixing and detection of laser beams by shining them on similar components in free space (e.g., tunnelling microscope tips and antenna-coupled tunnel junctions). Further, the scattering of radio signals by a mismatched antenna is known in radar, where control of the scattered field is an important aspect of stealth technology.

However, prior to the present invention, there has been no technological application of such modulation, and certainly not of using it with optical fields or with waveguides. The use of antenna-type structures in metal waveguides is known (e.g., in waveguide-to-coax transitions), but nothing similar has been done in dielectric waveguides, or at optical frequencies in any waveguide.

Figure 3:
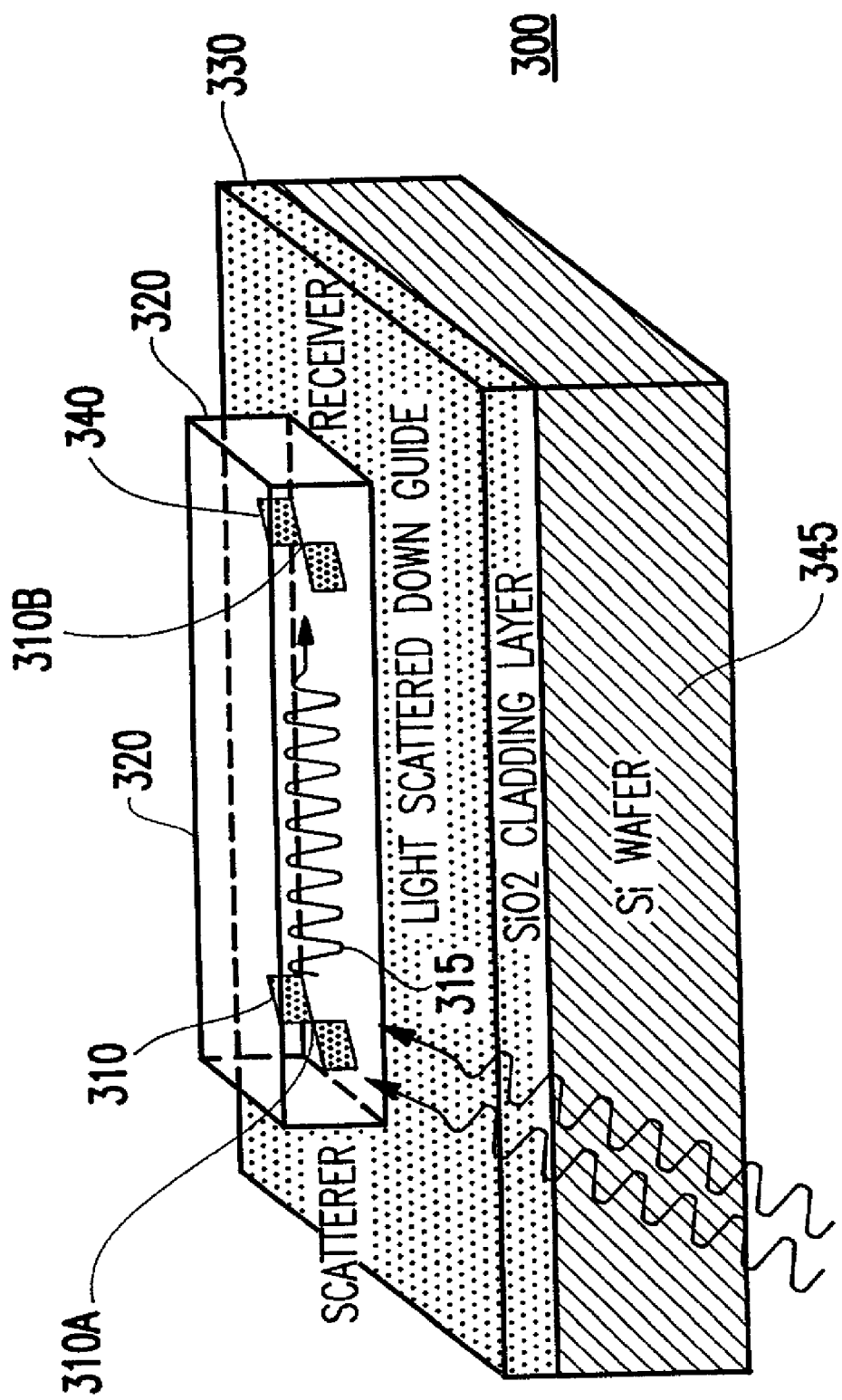
FIG. 3 illustrates a structure 300 according to the present invention.

Hence, with the invention, high speed optical interconnections now can be constructed entirely in monolithic silicon technology, as shown in FIG. 3, according to the present invention.

FIG. 3 illustrates a structure 300 including antenna structures 310, 340 formed in a waveguide 320 (e.g., a ridge-type waveguide formed of SiON, silicon, or the like). The waveguide 320 is formed on a cladding layer 330 formed, for example, of $SiO_2$. The cladding layer 330 may be formed on a silicon wafer 345.

With this structure, the antenna is illuminated (e.g., by the external laser light) and the antenna scatters the light differently, depending upon the state that the logic signal has (e.g., a "0" or a "1", "low" or "high", etc.). It is noted that a key feature of the invention is that practically infinite bandwidth can be achieved. For example, even in the infrared range, the optical frequencies are so high (tens to hundreds of terahertz), that even a relatively narrow bandwidth device (e.g., a high gain resonant antenna) has an enormous bandwidth from the standpoint of the electronics. Hence, even if a more complex structure needs to be built to achieve a certain coupling into the waveguide, the electronics can still remain relatively simple.

Returning now to FIG. 3, in the structure 300, a unipolar logic signal can be applied across a transmitting metal-insulator-metal (MIM) junction 310A (shown in greater detail in FIGS. 8 and 9), and a bias can be applied to the receiving magnetic (MIM) junction 310B (shown in greater detail in FIGS. 8 and 9) to optimize its sensitivity.

The logic signal modulates the impedance of the MIM junction, producing a scattered signal 315 which is modulated in amplitude, phase, or both. A portion of the scattered light 315 is collected by the waveguide, and is transferred to the receiving antenna 340.

The MIM detector (see FIGS. 8 and 9) attached to the receiving antenna 340 produces a baseband signal corresponding to the logic signal applied to the transmitting junction, which is amplified and restored to a logic-level voltage swing for further use.

The detection scheme can be either direct detection, in which the detected signal arises substantially from simple rectification of the incoming light in the waveguide, or coherent detection, in which the detected signal arises substantially from rectification of the optical interference of the light in the waveguide 320 with the incoming pump beam (laser light).

Coherent detection is phase-sensitive, which is a potential disadvantage, but is also highly sensitive to small amounts of waveguide radiation. This is an important advantage if the waveguide signal is weak.

The sensitivity of these simple bowtie-MIM detectors is approximately 100 mV when illuminated by 35 ps pulses (e.g., by the external laser light source) at an incident energy density of 800 J/m**2 (e.g., see Fumeaux et al. "Nanometer Thin-Film Ni—NiO—Ni Diodes For Detection and Mixing of 30 THz radiation", Infrared Physics & Technology, Volume 39, pp. 123–183 (1998)) measured in an impedance of 50 ohms, thereby showing that even in a simple direct-detection mode, sufficiently strong signals are easily detected in extremely wide bandwidths.

For radiation within the geometrical cross-section of the transmitting antenna 310, the coupling of the antenna to the field is very strong, so that it is possible to scatter a major fraction of the light incident from the substrate onto the waveguide 320 into guided modes, and hence to direct them onto the receiving antenna 340 for efficient detection. This is true whether the incident light comes through the substrate, from the top side, or via the waveguide itself.

There are many possible variations on this scheme, such as the use of separate antenna structures for receiving the incident beam and re-radiating it into the guide 320, having part of the antenna structure inside the guide 320 and part outside, the use of a waveguide 320 constructed all or partly of metal, dielectric-filled or hollow, or a combination of the waveguide-antenna-MIM scheme for one half of the link (transmit or receive) with a different scheme for the other half.

Other possibilities include generating the waveguide signal by mixing two different beams, so that the illumination and communication wavelengths can be widely different if desired (e.g., if the transparency ranges of the substrate and waveguide are not the same, or if the desired wavelength is not easily generated).

It is noted that the local oscillator beam used in the coherent detection of the guided wave need not be the same as the illumination beam, and can even be propagating in a different direction since the antenna structure has a pronounced spatial variation.

Figure 4:
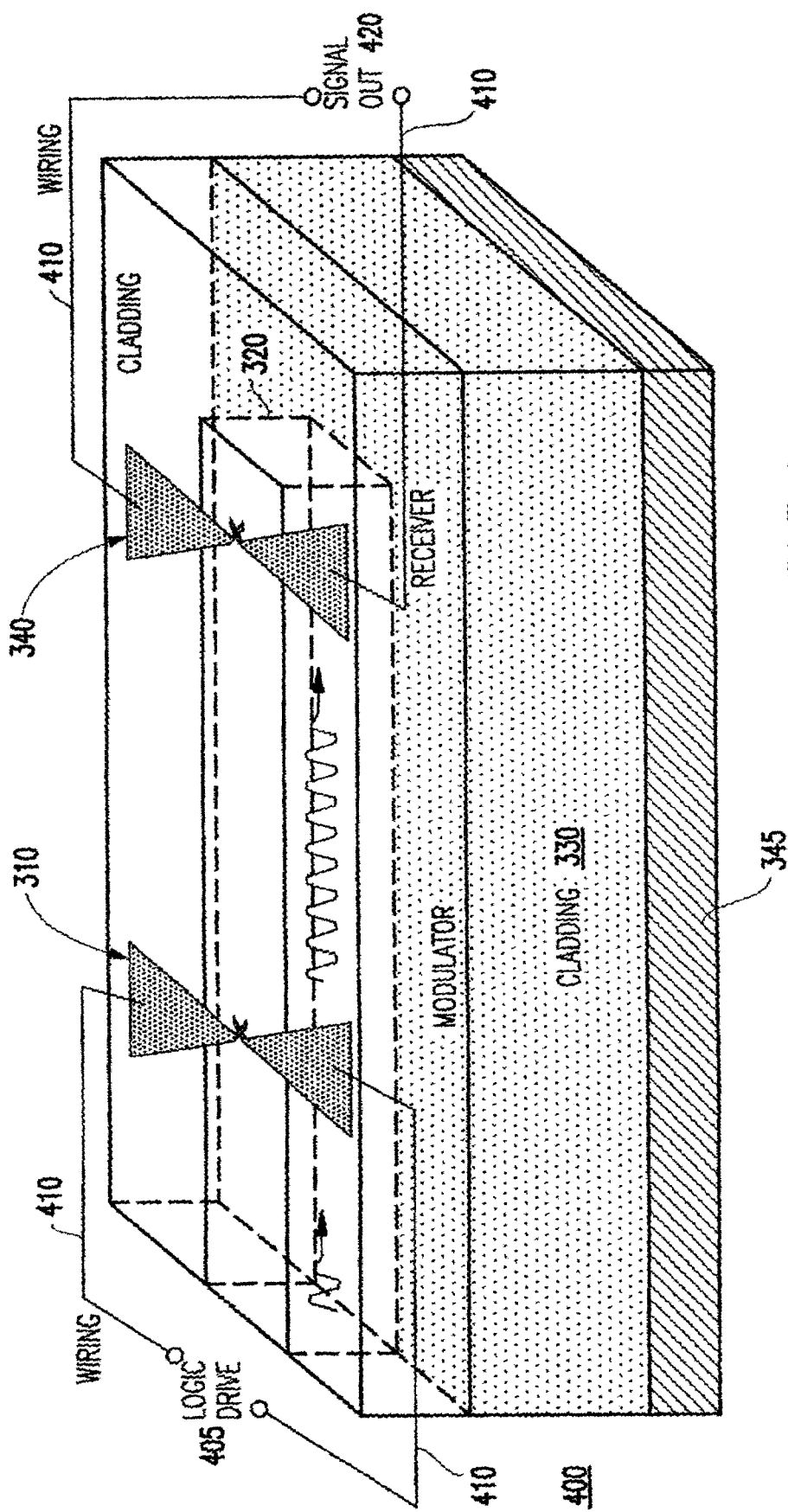
FIG. 4 illustrates another structure 400 according to the present invention, which is similar to FIG. 3 but illustrates a logic signal and wiring, as well as showing the light coming down the waveguide.

FIG. 4 illustrates a structure 400, which is somewhat similar to FIG. 3 but illustrates a logic signal input (not referenced), logic drive 405 and wirings 410 to each of the antennas 310, 340, which connect each of the antennas to the external circuits. Further shown is the signal output 420. Additionally, the light is traveling down the waveguide 320 instead of coming through the substrate as in FIG. 3.

Figure 5:
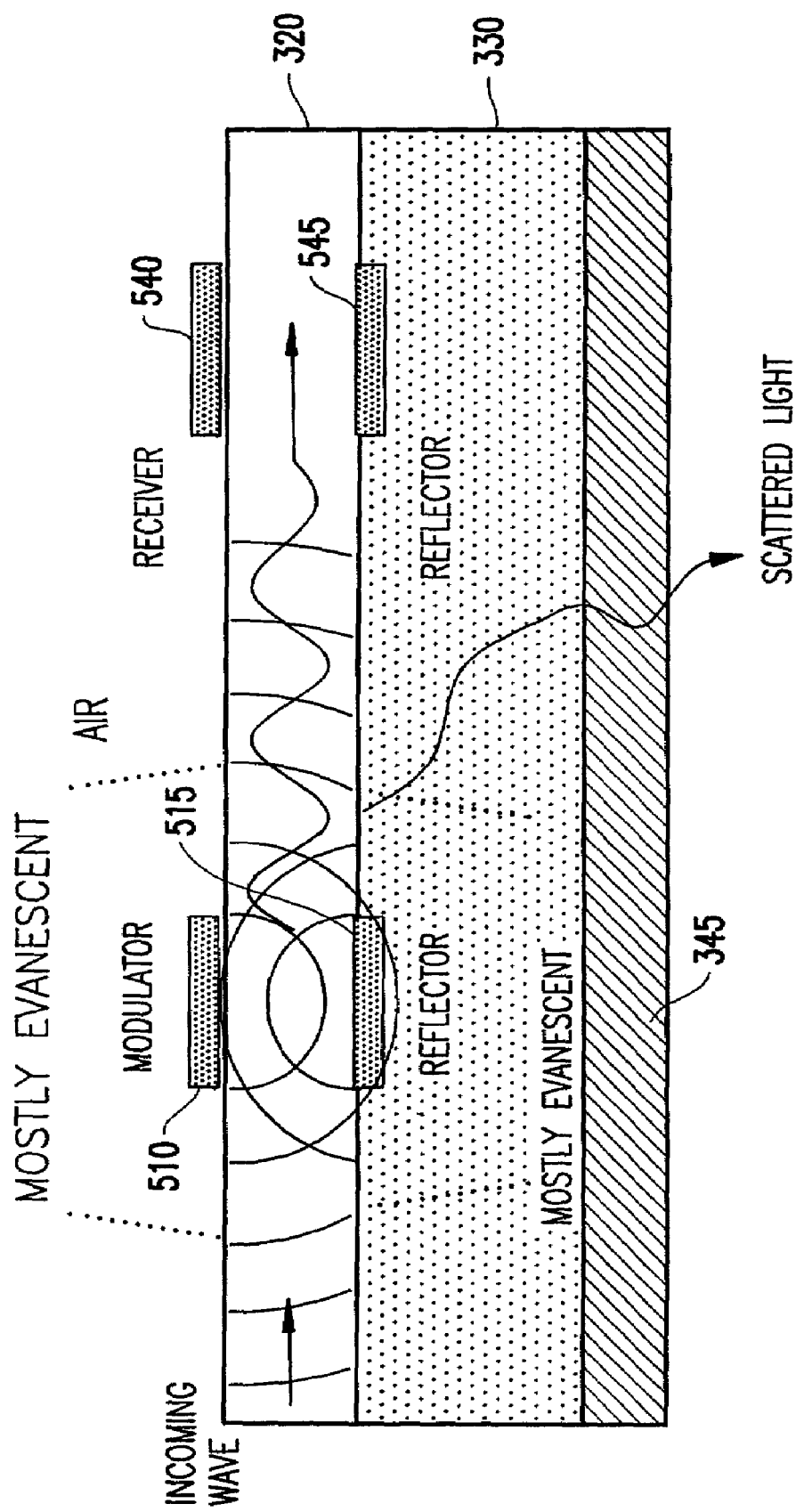
FIG. 5 illustrates an edge view of the structure 400 of FIG. 4.
Figure 6:
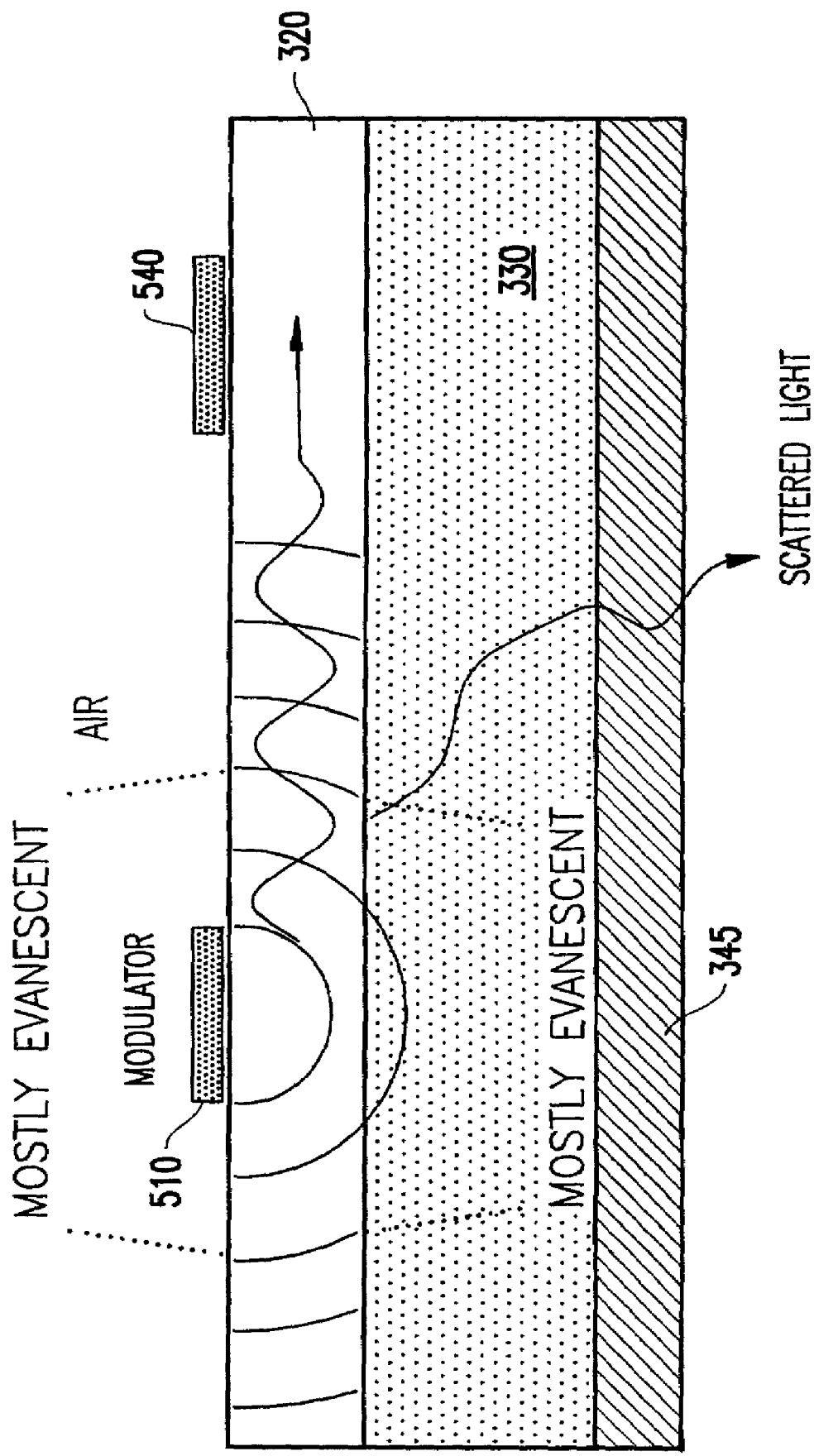
FIG. 6 illustrates an edge-wise view of the structure 400 of FIG. 4.

FIGS. 5 and 6 respectively illustrate an edge view and an end view of the structure 400 shown in FIG. 4.

Specifically, FIG. 5 clearly illustrates the antenna 310 including a modulator 510 and a reflector 515, and the antenna 340 including a receiver 540 and reflector 545.

FIG. 6 shows the receiver 540 which can be formed from Ni having two levels. The waveguide 320 may be formed of polysilicon having a thickness, for example, of about 1 µm. The cladding may have a thickness of 5 µm of insulating material such as $SiO_2$. Obviously, the invention is not limited to these thicknesses.

While the invention has been described in terms of several preferred embodiments, those skilled in the art will recognize that the invention can be practiced with modification within the spirit and scope of the appended claims.

For example, the antenna structure for use with the invention does not require the above-described exemplary bowtie shape. Indeed, other shapes can be employed. Further, as mentioned above, there can be other structures such as gratings, and the like used instead of the antennas.

Further, an array of the inventive structures can be provided at both ends of the waveguide, or with different sets of waveguides.

Further, the illumination can be performed either along the waveguide, or above the top surface of the waveguide. For example, it would be possible to provide the inventive structure in a waveguide junction to switch from one output waveguide to another.

Further, it is noted that the applications discussed above are merely exemplary and not in any way for limiting the invention. Along these lines, the invention can be advantageously used for high speed, short range optical interconnects between chips on a module, with essentially pure silicon technology (e.g., no InGaAsP lasers, no hybrid construction, etc.).

By the same token, one of ordinary skill in the art after a reading of the present application will find many more applications for the invention. For example, the invention could be used advantageously for a clock distribution mechanism or another application in which there is a one-to-many type of connection in which a single logic gate may be wired to many of the inventive structures. The capacitance of the inventive structures is relatively low and a single logic gate could be used to drive a plurality of the inventive structures. A one-to-many structure could also be constructed by using one inventive structure combined with known waveguide splitter or directional coupler technology.

Figure 7:
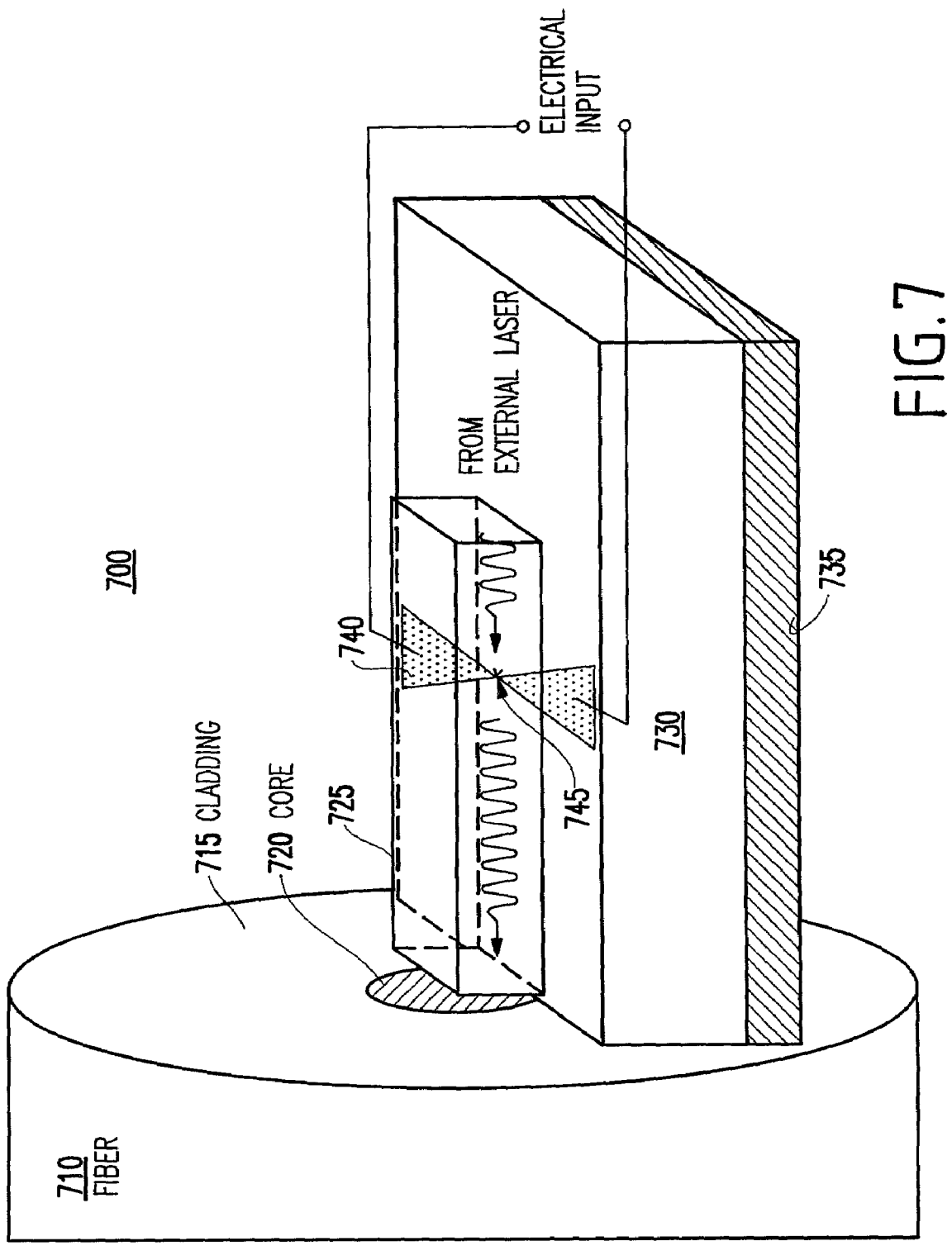
FIG. 7 illustrates another embodiment according to the present invention in which an optical fiber is employed.

Further, optical fiber communications would find benefit with the invention, as shown in the structure 700 of FIG. 7. As such, it may be possible to perform the antenna operation at a wavelength (e.g., about 1.5 microns, which is about a factor of 2 shorter at which it has been performed thus far) at which the fibers are transparent. Thus, if it is possible to achieve 1.5 microns, and have the structure still perform like an antenna, then it would be possible certainly to use the invention to launch waves into fiber.

Looking at FIG. 7 in greater detail, the structure 700 includes structure similar to that of FIGS. 3 and 4, but adapted for use with an optical fiber 710. The fiber 710 includes a cladding 715 and a core 720, and is mounted proximate to the waveguide 725 formed on a cladding 730. Cladding 730 is formed on a substrate 735 (e.g., a silicon wafer or the like). Also shown in FIG. 7 are the modulator 740 and the tunnel junction 745.

Figure 8:
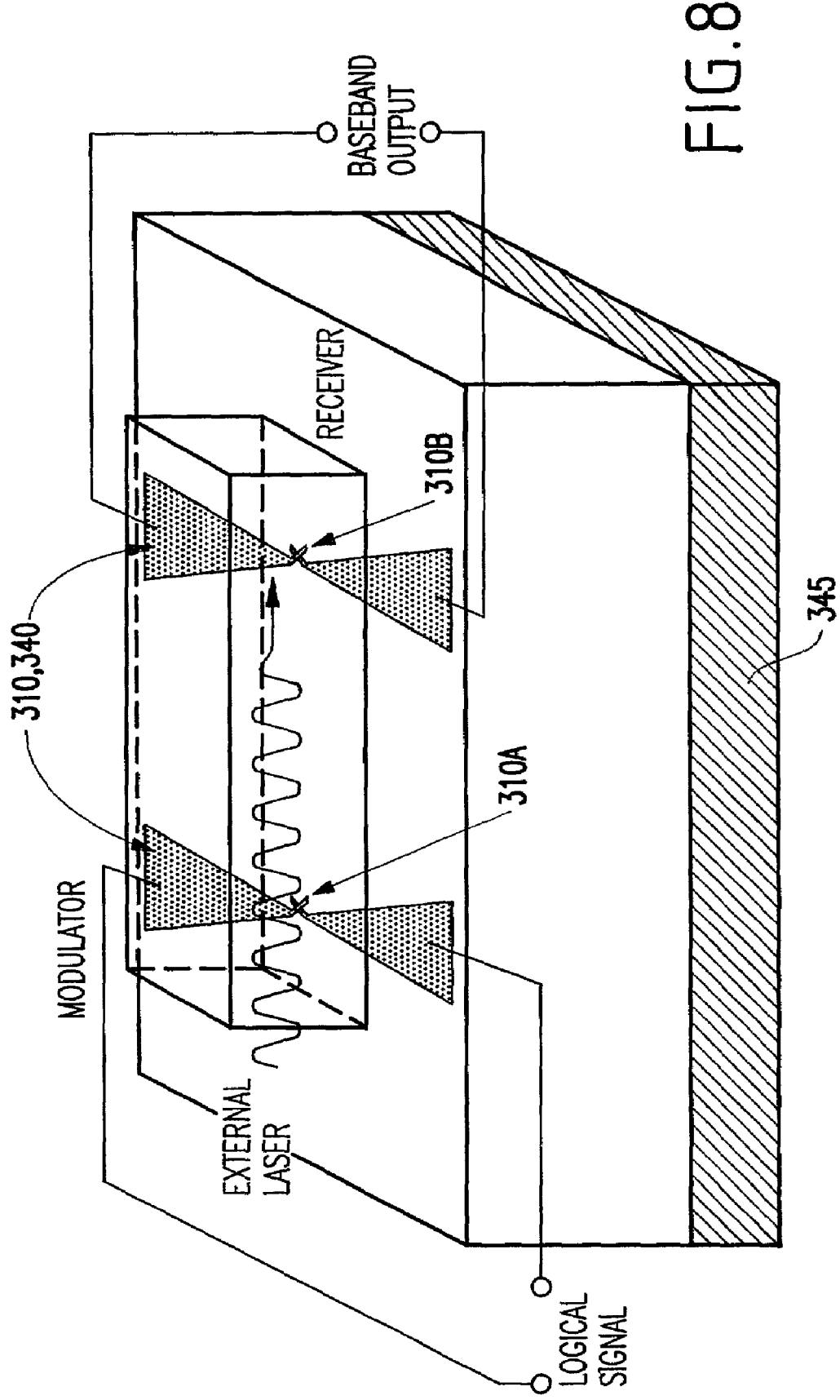
FIG. 8 illustrates the MIM detector and MIM detector junctions in greater detail as incorporated into the structure of FIG. 3.

FIG. 8 illustrates the MIM detector and MIM detector junctions shown in FIG. 3 in greater detail.

Figure 9:
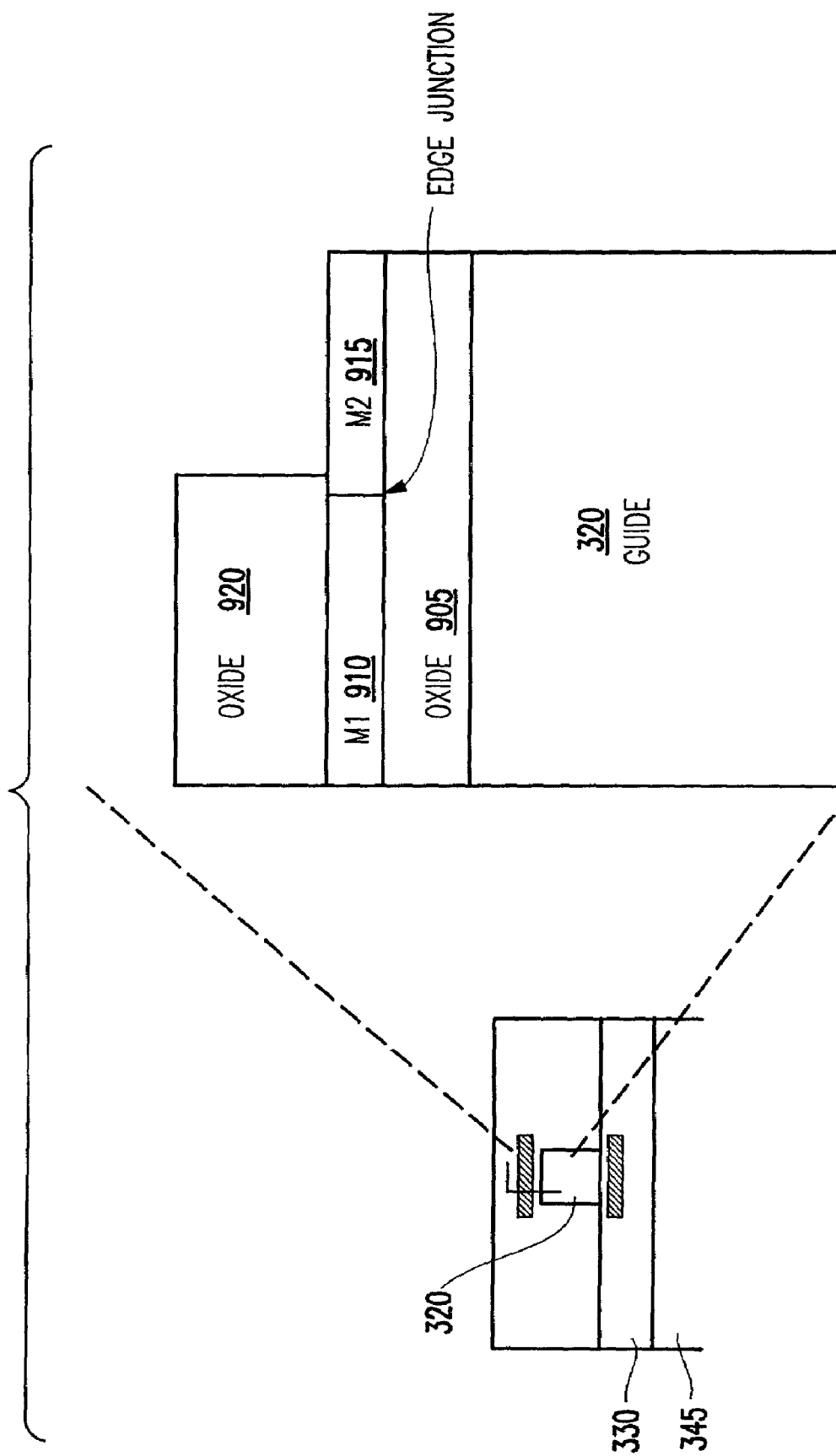
FIG. 9 illustrates a cross-section of the tunnel junction of the detector.

It is noted that FIG. 9 illustrates one exemplary, non-limiting embodiment of the tunnel junction of the detector. As shown in FIG. 9, the tunnel junction may include a first oxide layer 905 formed on the waveguide 320. Then, a metallization layer M1 910 is formed over the first oxide layer 905. Another metallization layer portion M2 915 is formed adjacent to the first metallization layer portion M1 910 over the oxide layer 905. As such, an edge junction is formed in which the metal overlaps the oxide layer, as opposed to overlapping the metal itself. This is better electromagnetically and is advantageous in that capacitance is reduced for the same junction area. However, it is noted that an overlapping junction (e.g., M2 overlapping M1) could be formed instead of an edge junction. Thus, the invention is not limited to either an overlapping tunnel junction or an edge tunnel junction structure.

Figure 10:
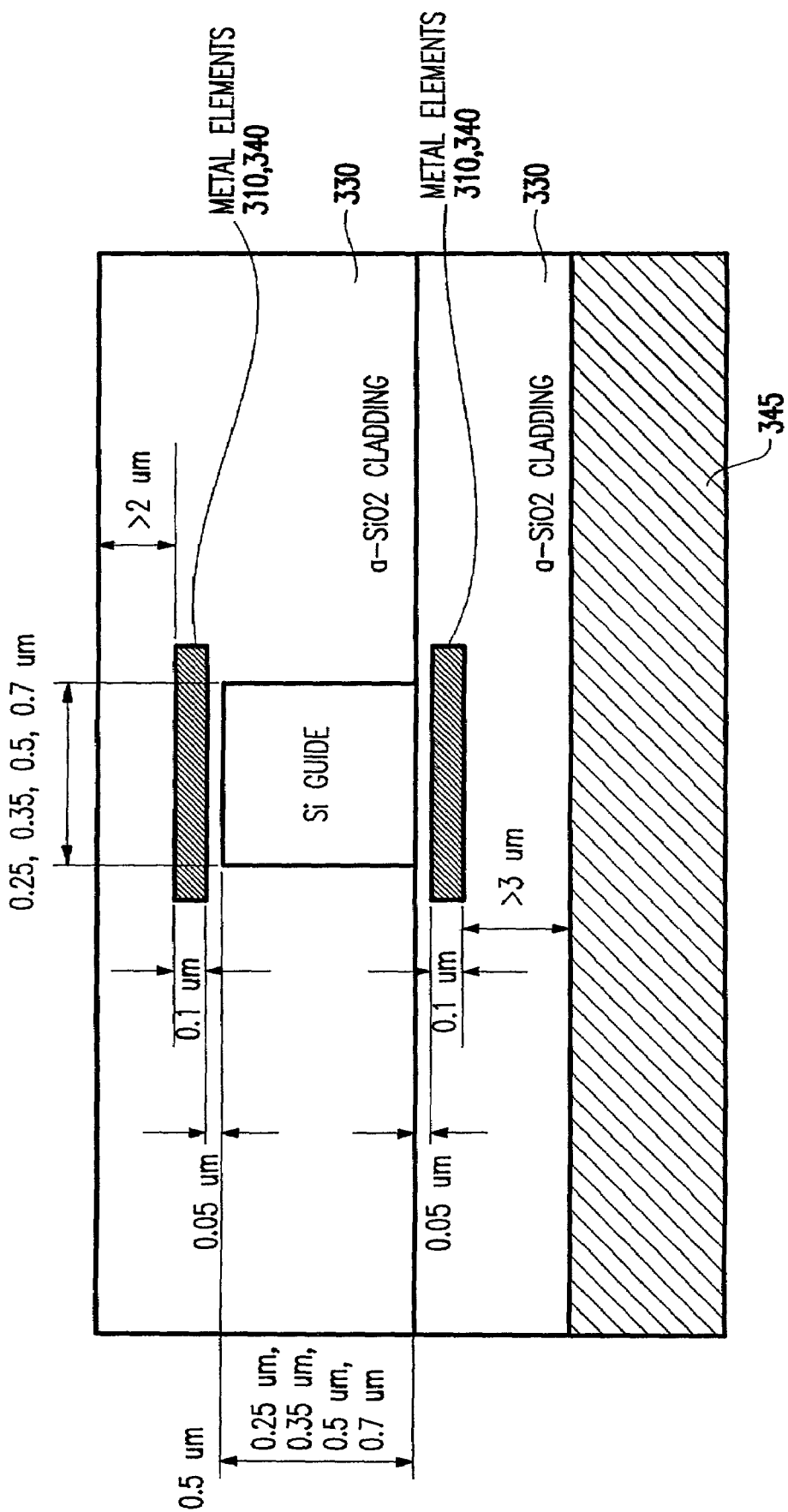
FIG. 10 illustrates exemplary dimensions for an optical waveguide according to the present invention.

FIG. 10 illustrates exemplary dimensions for an optical waveguide at 70, 100, 140, and 200 THz. Obviously, the invention is not limited to such exemplary thicknesses, etc.

Additionally, the invention could be used beneficially in an optical backplane (e.g., between circuit boards plugged into the backplane), or short-range fiber cable link (<30 meters) which would use slightly longer wavelengths than can be used for long-haul fiber communications. Thus, the invention could be used as a fiber local area network (LAN), thereby solving the many problems of electrical-to-optical-to-electrical conversions/connections in conventional fiber communications.

Additionally, the invention is not limited to the MIM tunnel junctions (e.g., overlapping metal lines with a metal oxide therebetween) described above.

For example, as mentioned above, the tunnel junction may be formed by any of a superconducting tunnel junction (such as a metal insulating superconductor (MIS) junction or Josephson junction) comprising a relatively thin (e.g., in a range of about 5 to 40 angstroms) barrier, a resonant tunnel diode, or even a super lattice or a heterojunction structure of some fashion, or a quantum well structure where the potential wells are fashioned to meet the designer's requirements.

Further, the invention is not limited to the specific variable impedance devices described. Again, since the invention is directed to achieving a quasi-electrical coupling of the optical field to the circuitry, there should be merely some type of variable impedance device which is capable of responding at optical frequencies. Further, the electrically-variable impedance device does not have to be purely resistive for the modulator to work, but can be a pure reactance (such as an electrically-variable capacitance) or a complex impedance.

Further, regarding the optical radiation source, the invention is not necessarily limited to a laser light source. Indeed, if sensitivity (and signal level) is not an issue, then other light sources could be employed such as a light emitting diode (LED) preferably tailored for the infrared (IR) range.

Moreover, it is noted that the invention is not necessarily limited to the IR spectrum. For example, there may be some dielectric structure which could be formed to concentrate a visible optical field onto the tunnel junction and still have the tunnel junction be able to respond to those frequencies.

What is claimed is:

1. An apparatus for producing a modulated optical signal in a waveguide, comprising:
    an antenna for communicating with the waveguide and with an externally-applied optical field and having an output port; and
    an electrically-variable-impedance device connected at the output port of the antenna, capable of responding at a frequency of an externally-applied optical field and having its impedance at the optical frequency changed by an applied electrical signal.

2. The apparatus as in claim 1, wherein the electrically-variable-impedance device comprises a tunnel junction.

3. The apparatus as in claim 2, wherein the tunnel junction comprises a metal-insulator-metal (MIM) structure.

4. The apparatus as in claim 3, wherein the MIM tunnel junction comprises closely juxtaposed metal lines with a layer of metal oxide therebetween.

5. The apparatus as in claim 4, wherein a metal line comprises nickel and the oxide comprises nickel oxide.

6. The apparatus as in claim 5, wherein an area of the junction is less than 100 nm square.

7. The apparatus as in claim 3, wherein a capacitance of the MIM junction is less than 100 attofarads.

8. The apparatus as in claim 2, wherein the electrically-variable impedance device comprises a Josephson junction.

9. The apparatus as in claim 1, wherein the electrically-variable impedance device comprises a Schottky barrier.

10. The apparatus as in claim 2, wherein the electrically-variable impedance device comprises a metal-insulator-superconductor barrier.

11. The apparatus as in claim 2, wherein the tunnel junction comprises a resonant tunnel diode.

12. An apparatus for detecting an optical signal in a waveguide, comprising:
    an antenna structure for communicating with the waveguide and having an output port; and
    an electrically-connected detector connected at the antenna's output port, capable of responding at a frequency of the optical signal in the waveguide and for producing a detected electrical signal at baseband.

13. The apparatus as in claim 12, wherein the electrically-connected detector comprises a tunnel junction.

14. The apparatus as in claim 13, wherein the tunnel junction comprises a metal-insulator-metal (MIM) structure.

15. The apparatus as in claim 14, wherein the MIM tunnel junction comprises closely juxtaposed metal lines with a layer of metal oxide between them.

16. The apparatus as in claim 15, wherein a metal line comprises nickel and the oxide comprises nickel oxide.

17. The apparatus as in claim 16, wherein an area of the junction is less than 100 nm square.

18. The apparatus as in claim 14, wherein a capacitance of the MIM junction is less than 100 attofarads.

19. The apparatus as in claim 12, wherein the electrically-connected detector comprises a Josephson junction.

20. The apparatus as in claim 12, wherein the electrically-connected detector comprises a Schottky barrier.

21. The apparatus as in claim 12, wherein the electrically-connected detector comprises a metal-insulator-superconductor barrier.

22. The apparatus as in claim 12, wherein the electrically-connected detector comprises a resonant tunnel diode.

23. The apparatus as in claim 12, wherein the electrically-connected detector comprises a semiconductor tunnel junction.

24. An apparatus for optical information transmission, comprising:
    a waveguide;
    a transmitting antenna structure for communicating with the waveguide and having an output port;
    a receiving antenna structure for communicating with the waveguide and having an output port;
    an electrically-variable-impedance device connected at the transmitting antenna's output port, capable of responding at a frequency of an externally-applied optical field and having its impedance at an optical frequency changed by an applied electrical signal; and
    an electrically-connected detector connected at the receiving antenna's output port, capable of responding at the frequency of an optical signal in the waveguide and producing a detected electrical signal at baseband.

25. The apparatus as in claim 24, further comprising:
    a source of optical radiation illuminating the transmitting antenna structure, at whose wavelength the waveguide structure transmits optical radiation from the transmitting antenna structure to the receiving antenna structure.

26. The apparatus as in claim 25, wherein the optical radiation is incident on the transmitting antenna by guided propagation in the waveguide structure.

27. The apparatus as in claim 25, wherein the optical radiation is incident on the transmitting antenna by unguided propagation.

28. A method for launching a modulated optical signal into a waveguide, comprising:
    providing a waveguide with an antenna structure for communicating with the waveguide and with an external optical field, and having an electrical output port;
    connecting an electrically-variable impedance device to the output port of the antenna structure;
    illuminating the antenna structure with an external optical beam at a wavelength at which the waveguide can transmit, so that a portion of the optical field is scattered into a waveguide mode; and
    applying an electrical signal to the electrically-variable-impedance device so as to modulate the portion of the optical field scattered into the waveguide mode by changing the terminating impedance seen by the antenna structure.

29. A method for launching a modulated optical signal into a waveguide, comprising:
    providing a waveguide with an antenna structure for communicating with the waveguide and with an external optical field, and having an electrical output port;
    connecting an electrically-variable impedance device to the output port of the antenna structure;
    illuminating the antenna structure with a guided optical beam in a waveguide mode at a wavelength at which the waveguide can transmit, so that a portion of the optical field is lost from the waveguide mode; and applying an electrical signal to the electrically-variable-impedance device so as to modulate the portion of the optical field lost from the waveguide mode by changing the terminating impedance seen by the antenna structure.

30. A method for detecting a modulated optical signal in a waveguide, comprising:

providing a waveguide with an antenna structure for communicating with the waveguide and having an electrical output port; and connecting an electrical detector for responding at the optical frequency to the output port of the antenna structure.

31. The apparatus according to claim 1, wherein a portion of the externally-applied optical field is scattered within said waveguide.

32. The apparatus according to claim 1, further comprising:

a second waveguide adjacent said waveguide, wherein the externally-applied optical field is scattered from said waveguide to said second waveguide.

33. The apparatus according to claim 1, wherein illumination by said optical field is performed along said waveguide.

34. The apparatus according to claim 1, wherein illumination by said optical field is performed above a top surface of said waveguide.

35. A waveguide junction, comprising:

the apparatus of claim 1, for switching from a first output waveguide to a second waveguide.

36. The apparatus according to claim 12, wherein said detector performs coherent detection.

37. The apparatus according to claim 12, wherein said detector performs direct detection.

38. A communication system, comprising:

a logic gate; and a plurality of ones of the apparatus according to claim 1, each of said plurality of apparatus being connected to said logic gate to form a one-to-many connection.

39. An apparatus for launching a modulated optical signal into a fiber, comprising:

a fiber;

an antenna for communicating with the fiber and with an externally-applied optical field and having an output port; and an electrically-variable-impedance device connected at the output port of the antenna, capable of responding at a frequency of an externally-applied optical field and having its impedance at the optical frequency changed by an applied electrical signal.

40. A fiber local area network (LAN), comprising:

the apparatus of claim 39.

41. An optical backplane, comprising:

first and second circuit boards; and the apparatus of claim 1 formed between said first and second circuit boards.

42. A circuit board incorporating the apparatus of claim 1.

43. A chip module incorporating the apparatus of claim 1.

44. An optical communication system, comprising:

the apparatus of claim 1; and a plurality of interconnects, wherein said externally-applied optical field is used for each of said plurality of interconnects, so as to form a one-to-many connection.

45. An optical communication system, comprising:

the apparatus of claim 1; and a plurality of interconnects, wherein said externally-applied optical field is used for each of said plurality of interconnects, so as to form a many-to-many connection.

46. An apparatus for launching optical information in a waveguide, comprising:

a waveguide;

an antenna structure for communicating with the waveguide and having an output port;

an electrically-variable-impedance device connected at the antenna's output port, capable of responding at more than one frequency of an externally-applied optical field and causing the antenna to radiate a mixing product between the optical frequencies.

47. An apparatus for detecting optical information in a waveguide, comprising:

a waveguide;

an antenna structure for communicating with the waveguide and having an output port;

an electrically-coupled detector at the antenna's output port, capable of responding at more than one frequency of an optical field in the waveguide and producing a detected electrical signal at a frequency corresponding to a mixing product of the optical frequencies.

48. The apparatus of claim 1, wherein:

said waveguide comprises a planar waveguide;

said apparatus further comprises said planar waveguide; and said antenna is monolithically integral with said planar waveguide.

* * * * *